US011492504B2

(12) United States Patent
Wang et al.

(10) Patent No.: US 11,492,504 B2
(45) Date of Patent: Nov. 8, 2022

(54) PHOTOCURABLE COMPOSITIONS AND METHODS FOR 3D PRINTING USING THEM

(71) Applicant: Saint-Gobain Performance Plastics Corporation, Solon, OH (US)

(72) Inventors: Lian Wang, Storrs, CT (US); Qiaoxi Li, Marlborough, MA (US); Jianfeng Zhang, Shrewsbury, MA (US); Xipeng Liu, Concord, MA (US); Taoran Hui, Storrs, CT (US)

(73) Assignee: Saint-Gobain Performance Plastics Corporation, Solon, OH (US)

( * ) Notice: Subject to any disclaimer, the term of this patent is extended or adjusted under 35 U.S.C. 154(b) by 381 days.

(21) Appl. No.: 16/143,062

(22) Filed: Sep. 26, 2018

(65) Prior Publication Data
US 2019/0092951 A1 Mar. 28, 2019

Related U.S. Application Data

(60) Provisional application No. 62/563,602, filed on Sep. 26, 2017.

(51) Int. Cl.
*B33Y 70/00* (2020.01)
*C09D 11/101* (2014.01)
(Continued)

(52) U.S. Cl.
CPC .......... *C09D 11/101* (2013.01); *B29C 64/112* (2017.08); *B29C 64/124* (2017.08);
(Continued)

(58) Field of Classification Search
None
See application file for complete search history.

(56) References Cited

U.S. PATENT DOCUMENTS 5,081,164 A * 1/1992 Lai .......................... A61K 6/887
522/77
5,639,413 A 6/1997 Crivello
(Continued)

FOREIGN PATENT DOCUMENTS

CN 10594800 A * 2/2016
CN 105694800 A 6/2016
(Continued)

OTHER PUBLICATIONS

Written Opinion and International Search Report in International Patent Application No. PCT/US2018/052939, dated Jan. 23, 2019.

*Primary Examiner* — Mohammad M Ameen
(74) *Attorney, Agent, or Firm* — McDonnell Boehen Hulbert & Berghoff LLP

(57) ABSTRACT

The present disclosure relates generally to photocurable compositions and methods for continuously forming a three-dimensional body from these compositions. More particularly, the present disclosure relates to photocurable compositions comprising a mixture of polysiloxanes capable of being dually cured, i.e., first by UV radiation followed by thermal treatment, or being cured by UV radiation. In one aspect, the disclosure provides a photocurable composition, including: a first polysiloxane comprising at least two acrylate or methacrylate groups per molecule; a second polysiloxane containing at least one (e.g., at least two) Si—H group per molecule; a third polysiloxane containing at least one (e.g., at least two) reactive aliphatic ethylene group per molecule; a free radical photoinitiator in an amount of about 0.01 to about 10 weight % based on the total weight of (meth)acrylate-containing polysiloxane in the composition; and a hydrosilylation catalyst in an amount of about 0.001 to about 10 weight % hydride-containing polysiloxane and vinyl-containing polysiloxane in the composition.

20 Claims, 4 Drawing Sheets

(51) Int. Cl.
*C09D 11/102* (2014.01)
*B33Y 10/00* (2015.01)
*B29C 64/124* (2017.01)
*B29C 64/112* (2017.01)
*B29C 64/135* (2017.01)

(52) U.S. Cl.
CPC .............. *B33Y 10/00* (2014.12); *B33Y 70/00* (2014.12); *C09D 11/102* (2013.01); *B29C 64/135* (2017.08)

(56) References Cited

U.S. PATENT DOCUMENTS

| | | | |
|---|---|---|---|
| 6,133,466 A * | 10/2000 | Edelmann | C08G 77/045 |
| | | | 106/436 |
| 6,251,327 B1 | 6/2001 | Bentz | |
| 9,211,678 B2 | 12/2015 | DeSimone | |
| 2003/0064232 A1 | 4/2003 | Allen | |
| 2006/0116500 A1 * | 6/2006 | Chapman | C08G 77/50 |
| | | | 528/15 |
| 2012/0220684 A1 * | 8/2012 | Bryson | C09D 193/04 |
| | | | 522/170 |
| 2014/0131908 A1 | 5/2014 | Sun | |
| 2016/0128911 A1 | 5/2016 | Fontein | |
| 2017/0066185 A1 | 3/2017 | Ermoshkin | |
| 2018/0066115 A1 | 3/2018 | Achenbach | |

FOREIGN PATENT DOCUMENTS

| | | | |
|---|---|---|---|
| WO | 2016069454 A1 | | 5/2015 |
| WO | 2016044547 A1 | | 3/2016 |
| WO | WO-2016-044547 A1 * | 3/2016 |
| WO | 2015134972 A1 | | 9/2016 |
| WO | WO-2016134972 A1 * | 9/2016 |
| WO | 2017040874 A1 | | 3/2017 |
| WO | 2017060573 A2 | | 4/2017 |
| WO | 2017079502 A1 | | 5/2017 |
| WO | 2017081028 A1 | | 5/2017 |

* cited by examiner

A

B

PHOTOCURABLE COMPOSITIONS AND METHODS FOR 3D PRINTING USING THEM

CROSS-REFERENCE TO RELATED APPLICATIONS

This application claims the benefit of priority of U.S. Provisional Patent Application No. 62/563,602, filed Sep. 26, 2017, which is hereby incorporated herein by reference in its entirety.

BACKGROUND OF THE DISCLOSURE

1. Field of the Disclosure

The present disclosure relates generally to photocurable compositions and methods for continuously forming a three-dimensional body from these compositions. More particularly, the present disclosure relates to photocurable compositions comprising a mixture of polysiloxanes capable of being dually cured, i.e., by UV radiation followed by thermal treatment, or by UV radiation only.

2. Technical Background

The manufacturing of polymeric three-dimensional (3-D) bodies based on a layer-by-layer buildup of a radiation curable liquid material has become of increasing interest, especially in view of the enhancement in production speed when a bottom-up technique is employed.

Curable compositions including polysiloxanes can be subjected to a curing process to form a reaction product of the polysiloxane, e.g., a cured material. This cured material is often in the form of a cross-linked material, where a liquid curable composition is rendered into a gel or solid by forming bonds between different polysiloxane chains. Cross-linked polysiloxanes can have variety of desirable properties. However, curable polysiloxane compositions have been generally unsuitable for printing or manufacturing of polymeric three-dimensional bodies, due to at least one of insufficient shear-thinning properties, insufficient transparency of the cured product, inconveniently slow curing time, difficulty of controlling dimensions of cured material, difficulty of processing due to high viscosity and unsuitability for efficient and effective use with various printing techniques.

Accordingly, there remains a need for photocurable compositions suitable for three-dimensional fabrication of polymeric articles.

SUMMARY OF THE DISCLOSURE

In one aspect, the present disclosure provides a photocurable composition, comprising:
- a first polysiloxane comprising at least two acrylate or methacrylate groups per molecule;
- a second polysiloxane containing at least one Si—H group per molecule;
- a third polysiloxane containing at least one reactive aliphatic ethylene group per molecule;
- a free radical photoinitiator in an amount of about 0.01 to about 10 weight % based on the total weight of (meth)acrylate-containing polysiloxane in the composition; and
- a hydrosilylation catalyst in an amount of about 0.001 to about 10 weight % based on the total weight of hydride-containing polysiloxane and vinyl-containing polysiloxane in the composition.

Another aspect provides methods of forming a three-dimensional body comprising: providing a photocurable composition of the disclosure; and curing the photocurable composition, e.g., with actinic radiation, to form a cured (e.g., photocured) three-dimensional body.

Another aspect provides methods of forming a three-dimensional body comprising: providing a photocurable composition of the disclosure; curing the photocurable composition with actinic radiation to form a photocured three-dimensional body; and curing the photocured three-dimensional body with heat to form a heat-cured three-dimensional body.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description, serve to explain the principles and operation of the disclosure.

DETAILED DESCRIPTION

Figure 1:
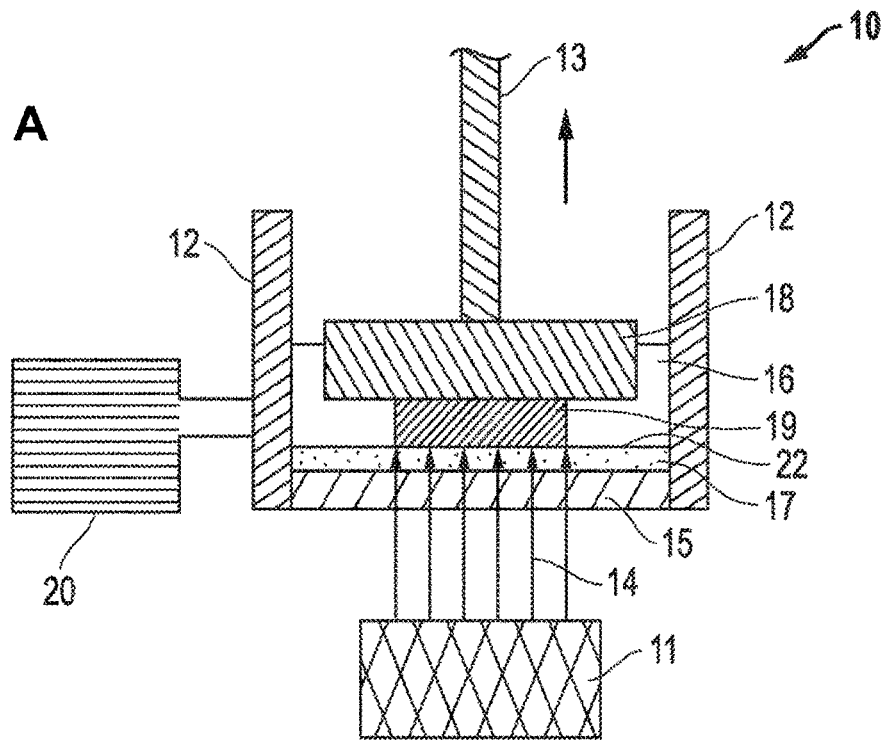
FIG. 1 is an illustration of an apparatus according to one embodiment useful in methods of the disclosure. (A) a starting phase of forming of a three-dimensional body; and (B) a later phase of forming of a three-dimensional body.
Figure 1:
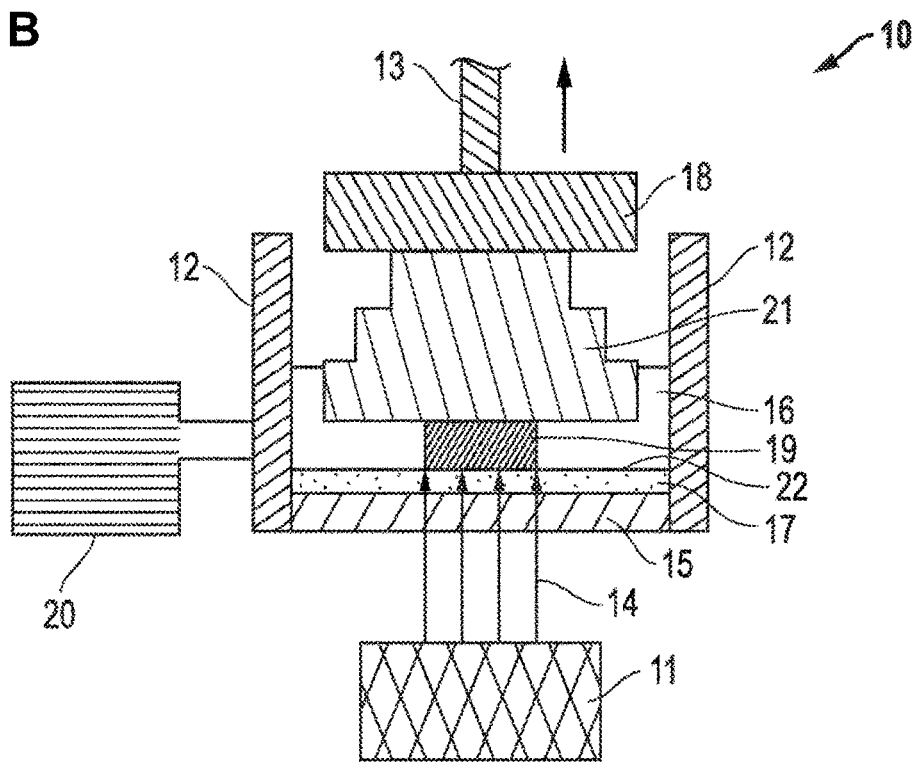

Before the disclosed processes and materials are described, it is to be understood that the aspects described herein are not limited to specific embodiments, apparatus, or configurations, and as such can, of course, vary. It is also to be understood that the terminology used herein is for the purpose of describing particular aspects only and, unless specifically defined herein, is not intended to be limiting. In view of the present disclosure, the materials and processes described herein can be configured by the person of ordinary skill in the art to meet the desired need.

Throughout this specification, unless the context requires otherwise, the word "comprise" and "include" and variations (e.g., "comprises," "comprising," "includes," "including") will be understood to imply the inclusion of a stated component, feature, element, or step or group of components, features, elements or steps but not the exclusion of any other integer or step or group of integers or steps.

As used in the specification and the appended claims, the singular forms "a," "an" and "the" include plural referents unless the context clearly dictates otherwise.

The term "cure" as used herein refers to exposing to any form of radiation, heating, or allowing to undergo a physical or chemical reaction that results in hardening or an increase in viscosity.

The term "UV" as used herein refers to ultraviolet light, which is electromagnetic radiation with a wavelength of about 10 nm to about 400 nm. In the context of UV curing wavelengths can be selected from, for example, the UVA and UVB wavebands located between 280 nm and 400 nm. In certain embodiments as otherwise described herein, curing is performed using radiation in the wavelength range of 360 nm to 450 nm. However, in certain embodiments, materials described herein are curable or cured at relatively long wavelengths, e.g., peak wavelength at least 370 nm, at least 380 nm, or even at least 390 nm, e.g., in the range of 370-450 nm, 380-450 nm, or 390-450 nm.

The term "radiation" as used herein refers to energetic particles travelling through a medium or space. Examples of radiation are visible light, infrared light, microwaves, radio waves, very low frequency waves, extremely low frequency waves, thermal radiation (heat), and black-body radiation.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

All percentages, ratios and proportions herein are by weight, unless otherwise specified.

This disclosure provides photocurable silicone compositions suitable for use in a variety of fabrication methods to provide a wide variety of final cured products. In various aspects and embodiments, photocurable compositions disclosed herein can be especially suitable for use in fabrication of three-dimensional polymeric bodies, e.g., using photocuring technologies. One advantage of various aspects of the disclosure is that the particular mixture of polysiloxanes can be provided to afford curable compositions that have low viscosity (e.g., less than about 10,000 cSt), which is highly desirable for use in certain three-dimensional fabrication techniques (such as continuous 3-D printing), yet still provide cured materials having desirable properties. The compositions of the disclosure can be provided with high UV sensitivity and oxygen polymerization inhibition, making them particularly suitable for certain 3-D printing techniques that benefit from such properties. Low viscosity and fast UV cure also affords better control of the fabrication process by allowing for higher fabrication rates and improved resolution and precision.

Thus, one aspect of the disclosure provides a photocurable composition, comprising:
a first polysiloxane comprising at least two acrylate or methacrylate groups per molecule;
a second polysiloxane containing at least one Si—H group per molecule;
a third polysiloxane containing at least one aliphatic ethylene group per molecule;
an effective amount of a free radical photoinitiator in an amount of about 0.01 to about 10 weight % based on the total weight of (meth)acrylate-containing polysiloxane in the composition; and
a hydrosilylation catalyst in an amount of about 0.001 to about 10 weight % based on the total weight of hydride-containing polysiloxane and vinyl-containing polysiloxane in the composition.

As described above, the photocurable composition of the disclosure includes a first polysiloxane. The first polysiloxane comprises at least two acrylate or methacrylate groups (e.g., at least about two acrylate or methacrylate groups bound to the polysiloxane chain through a siloxane silicon atom) per molecule. In certain embodiments, the first polysiloxane has about two acrylate or methacrylate groups per polysiloxane molecule. In certain embodiments, the first polysiloxane has more than about two acrylate or methacrylate groups per polysiloxane molecule. Examples of the first polysiloxane include poly(dimethylsiloxane-co-(methacryloxypropyl)methylsiloxane) or methacryloxypropyl terminated poly(dimethylsiloxane). Some suitable first polysiloxanes include Gelest RMS-083, Gelest DMS-U21, Gelest DMS-R05, Gelest DMS-R11, Gelest DMS-R22, Gelest DMS-R31, Gelest RMS-033, Gelest RMS-044, Gelest UMS-182, and Gelest UMS-992 (all available from Gelest, Morrisville, Pa.). The person of ordinary skill in the art will appreciate that a variety of silicone (meth)acrylates are suitable for use in the compositions described herein.

The first polysiloxane of the photocurable composition as otherwise described herein has a weight-average molecular weight ($M_W$) of less than about 100,000 g/mol. Unless otherwise indicated, a "molecular weight" as used throughout is "weight-average" molecular weight, $M_W$. $M_W$ may be calculated by using the equation: $\Sigma M_i^2 n_i / \Sigma M_i n_i$, where $n_i$ is the number of molecules of molecular weight $M_i$. The $M_W$ can be determined using any known technique, such as light scattering, small angle neutron scattering, X-ray scattering, or sedimentation velocity. Accordingly, in certain particular embodiments of the photocurable composition as otherwise described herein, the first polysiloxane has a $M_w$ of less than about 50,000 g/mol, or less than about 20,000 g/mol, or less than about 15,000 g/mol, or less than about 10,000 g/mol, or less than about 9,000 g/mol, or even less than about 8,000 g/mol, or about 6000 to about 10,000 g/mol, or about 6000 to about 9800 g/mol, or about 6000 to about 9500 g/mol, or about 6000 to about 9000 g/mol, or about 6000 to about 8000 g/mol, or about 6000 to about 7000 g/mol, or about 7000 to about 10,000 g/mol, or about 7000 to about 9800 g/mol, or about 7000 to about 9500 g/mol, or about 7000 to about 9000 g/mol, or about 7000 to about 8000 g/mol, or about 8000 to about 10,000 g/mol, or about 8000 to about 9800 g/mol, or about 8000 to about 9500 g/mol, or about 8000 to about 9000 g/mol, or about 6500 to about 7500 g/mol, or about 6800 to about 7200 g/mol.

In certain embodiments of the photocurable compositions as otherwise described herein, the first polysiloxane is present in the composition in an amount of up to about 50%, up to about 40%, or up to about 30%, or up to about 27 wt %, or up to about 25%, or up to about 20 wt %, or about 1 wt % to about 50 wt %, or about 1 wt % to about 40 wt %, or about 2 wt % to about 40 wt %, or about 5 wt % to about 40 wt %, or about 1 wt % to about 30 wt %, or about 2 wt % to about 30 wt %, or about 5 wt % to about 30 wt %, or about 1 wt % to about 20 wt %, or about 5 wt % to about 20 wt %, or about 5 wt % to about 15 wt %, or about 7 wt % to about 20 wt %, or about 7 wt % to about 16 wt %, or about 22 wt % to about 27 wt %, or about 24 wt % to about 26 wt %. In certain particular embodiments of the photocurable composition as otherwise described herein, the first polysiloxane is present in the composition in an amount of about 10 wt % to about 50 wt %.

As described above, the photocurable composition of the disclosure includes a second polysiloxane containing at least one (and, in some embodiments, at least about two) Si—H groups per molecule. The person of ordinary skill in the art will understand that the "Si—H" groups described herein are those that are reactive to hydrosilylate a reactive aliphatic ethylene group, as mediated by the hydrosilylation catalyst. In certain embodiments of the compositions as otherwise described herein, the second polysiloxane has at least 1.75 Si—H groups per molecule, or at least 1.9 Si—H groups per molecule.

The photocurable composition of the disclosure also includes a third polysiloxane containing at least one reactive aliphatic ethylene (and, in some embodiments, at least about two) groups per molecule. As used herein, a "reactive aliphatic ethylene" group is one having a C═C double bond that is reactive to hydrosilylation by an Si—H group, as mediated by the hydrosilylation catalyst. In certain embodiments, each reactive aliphatic ethylene group of the third polysiloxane is not a (meth)acrylate. In certain embodiments of the compositions as otherwise described herein, the second polysiloxane has at least 1.75 reactive aliphatic ethylene groups per molecule, or at least 1.9 reactive aliphatic ethylene groups per molecule.

In certain such embodiments, the second and third polysiloxane are provided together, e.g., as part of a curable liquid silicone rubber (LSR) or liquid injection molding silicone (LIMS) formulation, for example, Dow Corning Shore 50, QP1-230, QP1-240, QP1-250, QP1-260, and QP1-270 LSR (all available from Dow Corning Corporation, Auburn, Mich.), Silopren UV LSR 2030 and UV LSR 2060 (available from Momentive), UV-PDMS KER-4690 and KER-4691 (available from Shin-Etsu), and Powersil 680 UV (Wacker). Of course, in other embodiments, the second and third polysiloxanes can be provided separately.

In certain embodiments of the photocurable compositions as otherwise described herein, the second polysiloxane, the third polysiloxane or the combination thereof is present in the composition in an amount of up to about 80%, up to about 60%, or up to about 50%, or up to about 40 wt %, or up to about 30%, or up to about 20%, or about 1 wt % to about 80 wt %, or about 1 wt % to about 60 wt %, or about 10 wt % to about 60 wt %, or about 20 wt % to about 60 wt %, or about 1 wt % to about 50 wt %, or about 10 wt % to about 50 wt %, or about 20 wt % to about 50 wt %, or about 30 wt % to about 50 wt %, or about 1 wt % to about 20 wt %, or about 1 wt % to about 10 wt %. In certain particular embodiments of the photocurable composition as otherwise described herein, the second polysiloxane, the third polysiloxane, or the combination thereof is present in the composition in an amount of about 15 wt % to about 40 wt %.

In certain embodiments of the photocurable compositions as otherwise described herein, the first polysiloxane, the second polysiloxane, the third polysiloxane, the photoinitiator and the hydrosilylation catalyst are present in the composition in a total amount of at least 50 wt %, e.g., at least 60 wt %, at least 70 wt %, at least 80 wt %, at least 90 wt %, at least 95 wt %, or even at least 98 wt % of the composition.

In certain embodiments of the photocurable compositions as otherwise described herein, the first polysiloxane is present in the composition in an amount in the range of about 20 wt % to about 80 wt %; and the second polysiloxane and the third polysiloxane are present in the composition in a total amount in the range of about 20 wt % to about 80 wt %.

The second polysiloxane and the third polysiloxane of the photocurable composition as otherwise described herein each have a weight-average molecular weight ($M_W$) of up to about 1,000,000 g/mol. Accordingly, in certain embodiments of the photocurable composition as otherwise described herein, the second polysiloxane and the third polysiloxane each have a $M_w$ of more than about 500,000 g/mol, or more than about 100,000 g/mol, or less than about 100,000 g/mol, or less than about 50,000 g/mol, or less than about 20,000 g/mol, or less than about 15,000 g/mol, or less than about 10,000 g/mol, or about 6000 to about 1,000,000 g/mol, or about 6000 to about 500,000 g/mol, or about 6000 to about 100,000 g/mol, or about 6000 to about 50,000 g/mol, or about 6000 to about 20,000 g/mol, or about 6000 to about 10,000 g/mol, or about 6000 to about 9000 g/mol, or about 6000 to about 8000 g/mol, or about 10,000 to about 1,000,000 g/mol, or about 10,000 to about 500,000 g/mol, or about 10,000 to about 100,000 g/mol, or about 50,000 to about 1,000,000 g/mol, or about 50,000 to about 500,000 g/mol, or about 50,000 to about 100,000 g/mol, or about 100,000 to about 1,000,000 g/mol, or about 100,000 to about 500,000 g/mol, or about 200,000 to about 500,000 g/mol.

As described above, the photocurable composition of the disclosure may further include a fourth polysiloxane. The fourth polysiloxane comprises at least about one aliphatic ethylene group (e.g., one aliphatic ethylene group and one Si—H group bound to the polysiloxane chain through a siloxane silicon atom) and at least about one Si—H group per molecule. The aliphatic ethylene and Si—H groups may be independently terminal groups or located on the side chain. In certain embodiments, the fourth polysiloxane is α-monovinyl-w-monohydride terminated polysiloxane. Suitable examples includes α-monovinyl-w-monohydride terminated poly(dimethylsiloxane). Some suitable fourth polysiloxanes include Gelest DMS-HV15, Gelest DMS-22, and Gelest ExSil™ 100 (both available from Gelest, Morrisville, Pa.). In certain embodiments of the compositions as otherwise described herein, the fourth polysiloxane further comprises other functional groups, such as phenyl or fluoro groups. Advantageously, the person of ordinary skill in the art can tune the viscosity of the overall composition using the fourth polysiloxane, e.g., to lower the viscosity to a level as described elsewhere herein.

The level of aliphatic ethylene and Si—H functionality on the fourth polysiloxane can be varied by the person of ordinary skill in the art in view of the present specification. For example, in certain embodiments as otherwise describe herein, the fourth polysiloxane has in the range of about 1 to about 20 mol % aliphatic ethylene groups and about 1 to about 20 mol % Si—H groups (i.e., as compared to silicon atoms).

The fourth polysiloxane of the photocurable composition as otherwise described herein has a weight-average molecular weight ($M_W$) of less than about 100,000 g/mol. Accordingly, in certain particular embodiments of the photocurable composition as otherwise described herein, the fourth polysiloxane has a $M_w$ of less than about 50,000 g/mol, or less than about 20,000 g/mol, or less than about 15,000 g/mol, or less than about 10,000 g/mol, or less than about 9,000 g/mol, or even less than about 8,000 g/mol, or about 6000 to about 10,000 g/mol, or about 6000 to about 9800 g/mol, or about 6000 to about 9500 g/mol, or about 6000 to about 9000 g/mol, or about 6000 to about 8000 g/mol, or about 6000 to about 7000 g/mol, or about 7000 to about 10,000 g/mol, or about 7000 to about 9800 g/mol, or about 7000 to about 9500 g/mol, or about 7000 to about 9000 g/mol, or about 7000 to about 8000 g/mol, or about 8000 to about 10,000 g/mol, or about 8000 to about 9800 g/mol, or about 8000 to about 9500 g/mol, or about 8000 to about 9000 g/mol, or about 9200 to about 9800 g/mol, or about 9300 to about 9700 g/mol.

In certain embodiments of the photocurable compositions as otherwise described herein, the fourth polysiloxane is present in the composition in an amount of up to about 80%, or up to about 70%, or up to about 60 wt %, or up to about 50%, or up to about 45 wt %, or about 10 wt % to about 80 wt %, or about 20 wt % to about 80 wt %, or about 30 wt % to about 80 wt %, or about 40 wt % to about 80 wt %, or about 10 wt % to about 60 wt %, or about 20 wt % to about 60 wt %, or about 30 wt % to about 60 wt %, or about 10 wt % to about 50 wt %, or about 20 wt % to about 50 wt %, or about 30 wt % to about 50 wt %, or about 1 wt % to about 50 wt %, or about 1 wt % to about 45 wt %, or about 5 wt % to about 50 wt %, or about 1 wt % to about 20 wt %, or about 5 wt % to about 30 wt %. All wt % values described in this disclosure based of the total weight of the polysiloxane composition (i.e., uncured composition). In certain particular embodiments of the photocurable composition as otherwise described herein, the fourth polysiloxane is present in the composition in an amount of about 20 wt % to about 60 wt %.

In certain embodiments of the photocurable compositions as otherwise described herein, the first polysiloxane, the second polysiloxane, the third polysiloxane, any fourth polysiloxane, the photoinitiator and the hydrosilylation catalyst are present in the composition in a total amount of at least 50 wt %, e.g., at least 60 wt %, at least 70 wt %, at least 80 wt %, at least 90 wt %, at least 95 wt %, or even at least 98 wt % of the composition.

While the disclosure herein describes "a first polysiloxane," "a second polysiloxane," "a third polysiloxane," and "a fourth polysiloxane," the person of ordinary skill in the art will appreciate that each of these components can be made up of a plurality of such siloxanes.

In order to adjust the viscosity, the person of ordinary skill in the art can, based on the disclosure herein, include one or more monofunctional reactive diluents in the photocurable composition. A monofunctional reactive diluent can include, for example, a single (meth)acrylate group, or a single reactive aliphatic ethylene group, or a single Si—H group. While a monofunctional reactive diluent will not aid in crosslinking the polymer network, it will bind into the polymer, and so would not be subject to evaporation after curing. Monofunctional reactive diluents can be present in the composition in a variety of amounts, e.g., in a total amount up to about 30 wt %, or up to about 20 wt %, e.g., in the range of about 5 wt % to about 30 wt %, or in the range of about 5 wt % to about 20 wt %. The person of ordinary skill in the art can use, for example, a relatively low molecular weight siloxane bearing a single (meth)acrylate group, or a single reactive aliphatic ethylene group, or a single Si—H group.

In certain embodiments of the photocurable compositions as otherwise described herein, the first polysiloxane, the second polysiloxane, the third polysiloxane, any fourth polysiloxane, any reactive diluent, the photoinitiator and the hydrosilylation catalyst are present in the composition in a total amount of at least 50 wt %, e.g., at least 60 wt %, at least 70 wt %, at least 80 wt %, at least 90 wt %, at least 95 wt %, or even at least 98 wt % of the composition.

As the person of ordinary skill in the art will appreciate, the hydrosilylation reaction is a 1:1 reaction between one Si—H moiety and one reactive aliphatic ethylene moiety. Accordingly, in certain embodiments, the molar ratio of Si—H to reactive aliphatic ethylene (e.g., non-(meth)acrylate) in the overall formulation is near to 1:1, e.g., in the range of 3:2 to 2:3, or in the range of 5:4 to 4:5, or in the range of 9:8:8:9.

The photocurable composition as otherwise described herein also requires a photoinitiator (e.g., an ultra violet (UV) photoinitiator). The photoinitiator can be any suitable photoinitiator, such that the photocurable composition or the cured product thereof has the properties described herein. For example, the photoinitiator can be at least one of benzil, a benzoin compound (e.g., a benzoin ether), a benzyl ketal, an a-dialkoxyacetophenone, an a-hydroxyalkylphenones, an a-aminoalkylphenones, an acyl-phosphine oxide, a benzophenone, a benzoamine, a thioxanthone, a thioamine, and a titanocene. In certain embodiments, the photoinitiator may be 1-phenyl-1,2-propanedione (PPD), p-(octyloxyphenyl)-phenyliodonium hexafluoroantimonate, azobisisobutyronitrile (AIBN), 2,2-dimethoxy-2-phenylacetophenone (DMPA), benzoyl peroxide, 2-hydroxy-2-methyl-l-phenyl-1-propanone (HMPP), benzoin, benzoin ethyl ether, benzoin methyl ether, 4,4'-dimethoxybenzoin, 4,4'-dimethylbenzil, 2-benzyl-2-(dimethylamino)-4'-morpholinobutyrophenone, 4'-tert-butyl-2',6'-dimethylacetophenone, 2,2-diethoxyacetophenone, 2,2-dimethoxy-2-phenylacetophenone, diphenyl(2,4,6-trimethylbenzoyl)phosphine oxide/2-hydroxy-2-methylpropiophenone, 4'-ethoxyacetophenone, 3'-hydroxyacetophenone, 4'-hydroxyacetophenone, 1-hydroxycyclohexyl phenyl ketone, 2-hydroxy-4'-(2-hydroxyethoxy)-2-methylpropiophenone, 2-hydroxy-2-methylpropiophenone, 2-methyl-4'-(methylthio)-2-morpholinopropiophenone, 4'-phenoxyacetophenone, benzophenone, benzophenone-3,3',4,4'-tetracarboxylic dianhydride, 4-benzoylbiphenyl, 4,4'-bis(diethylamino)benzophenone, 4,4'-bis [2-(1-propenyl)phenoxy]-benzophenone, 4-(diethylamino)benzophenone, 4,4'-dihydroxybenzophenone, 4-(dimethylamino)benzophenone, 3,4-dimethylbenzophenone, 3-hydroxybenzophenone, 4-hydroxybenzophenone, 2-methylbenzophenone, 3-methylbenzophenone, 4-methylbenzophenone, methyl benzoylformate, Michler's ketone, bis(4-tert-butylphenyl)iodonium perfluoro-1-butanesulfonate, bis(4-tert-butylphenyl)iodonium p-toluenesulfonate, bis(4-tert-butylphenyl)iodonium triflate, boc-methoxyphenyldiphenylsulfonium triflate, (4-bromophenyl)-diphenylsulfonium triflate, (tert-butoxycarbonylmethoxynaphthyl)-diphenylsulfonium triflate, (4-tert-butylphenyl)diphenylsulfonium triflate, diphenyliodonium hexafluorophosphate, diphenyliodonium nitrate, diphenyliodonium perfluoro-1-butanesulfonate, diphenyliodonium p-toluenesulfonate, diphenyliodonium triflate, (4-fluorophenyl)diphenylsulfonium triflate, N-hydroxynaphthalimide triflate, N-hydroxy-5-norbornene-2,3-dicarboximide perfluoro-1-butanesulfonate, (4-iodophenyl) diphenylsulfonium triflate, (4-methoxyphenyl) diphenylsulfonium triflate, 2-(4-methoxystyryl)-4,6-bis (trichloromethyl)-1,3,5-triazine, (4-methylphenyl)-diphenylsulfonium triflate, (4-methylthiophenyl)methyl phenyl sulfonium triflate, 1-naphthyl diphenylsulfonium triflate, (4-phenoxyphenyl)diphenylsulfonium triflate, (4-phenylthiophenyl)-diphenylsulfonium triflate, triarylsulfonium hexafluoroantimonate salt, bis-(4-methoxybenzoyl)diethylgermanium, triarylsulfonium hexafluorophosphate salt, triphenylsulfonium perfluoro-l-butanesufonate, triphenylsulfonium triflate, tris(4-tert-butylphenyl) sulfonium perfluoro-1-butanesulfonate, tris(4-tert-butylphenyl)-sulfonium triflate, anthraquinone-2-sulfonic acid sodium salt monohydrate, 2-tert-butylanthraquinone, camphorquinone, diphenyl(2,4,6-trimethylbenzoyl)phosphine oxide, 9,10-phenanthrenequinone, bis(2,4,6-trimethylbenzoyl)-phenylphosphineoxide, 1-chloro-4-propoxy-9H-thioxanthen-9-one, 2-chlorothioxanthen-9-one, 2,4-diethyl-9H-thioxanthen-9-one, isopropyl-9H-thioxanthen-9-one, 10-methylphenothiazine, or thioxanthen-9-one. In certain embodiments, the photoinitiator is bis(2,4,6-trimethylbenzoyl)-phenylphosphineoxide, bis-(4-methoxybenzoyl)diethylgermanium, or p-(octyloxyphenyl)-phenyliodonium hexafluoroantimonate. In certain embodiments, the photoinitiator is 1-phenyl-1,2-propanedione.

In certain desirable embodiments, the photoinitiator has substantial absorption at relatively long wavelengths, e.g., at least 360 nm, for example, at least 370 nm or even at least 380 nm. This can be especially desirable, as many three-dimensional printing systems use lamps of relatively long wavelength; when a photoinitiator has substantial absorption at such wavelengths, it can decompose to give reactive radicals when irradiated at such wavelengths. The person of ordinary skill in the art will select a photoinitiator based on the disclosure herein, and, e.g., based on the particular photocuring lamp to be used. One particular photoinitiator having substantial absorption at a long wavelength (~390 nm) is 1-phenyl-1,2-propanedione. TPO also has relatively high absorption at 390 nm.

Moreover, the photoinitiator can be provided as a plurality of photoinitiators (e.g., two photoinitiators). In certain embodiments, a first photoinitiator has substantially higher absorption (e.g., at least 2 times, at least 5 times, or even at least 10 times) than a second photoinitiator at relatively long wavelengths (e.g., at least 360 nm, for example, at least 370 nm or even at least 380 nm). For example, in certain embodiments, the curable composition includes a first photoinitiator having an absorption at least 2 times (e.g., at least 5 times, or at least 10 times) that of a second photoinitiator at 380 nm. In certain embodiments, the curable composition includes a first photoinitiator having an absorption at least 2 times (e.g., at least 5 times, or at least 10 times) that of a second photoinitiator at 380 nm. In certain such embodiments, the long absorption wavelength photoinitiator can be decomposed by long-wavelength radiation to form radicals, which can cause the other, shorter-wavelength photoinitiator to decompose to radicals. Thus, the person of ordinary skill in the art can tune for a desired degree of overall reactivity and a desired initiation wavelength. For example, in one embodiment, a longer absorption wavelength phosphine oxide initiator (e.g., TPO) can be used in combination with a shorter wavelength acetophenone initiator (e.g., 2,2-dimethoxy-2-phenylacetophenone (DMAPA). The two different photoinitiators can be used in any desirable, weight ratio. For example, in the TPO/DMAPA combination noted above, the photoinitiator combination can include 15-25 parts of TPO and 75-85 parts DMAPA. The TPO can decompose under 395 nm radiation, and trigger the larger portion of DMAPA to decompose to radicals to provide the bulk of the polymerization initiation. This can be advantageous as compared to using DMAPA alone, because DMAPA will decompose to radicals only slowly at 395 nm.

The photoinitiator can be present as any suitable amount in the photocurable composition, such in an amount of about 0.01 to about 10 weight % based on the total weight of (meth)acrylate-containing polysiloxane in the composition. An "effective amount" is an amount effective to make the curable composition photocurable. In certain embodiments, the photoinitiator is present in an amount of about 0.1 to about 5 weight % based on the total weight of the composition, e.g., about 0.1 to about 4 wt %, or about 0.1 wt % to about 3 wt %, or about 0.1 wt % to about 2 wt %, or about 0.1 wt % to about 1.7 wt %, or about 0.1 wt % to about 1.5 wt %, or about 0.1 wt % to about 1 wt %, or about 0.5 wt % to about 5 wt %, or about 0.5 wt % to about 4 wt %, or about 0.5 wt % to about 3 wt %, or about 0.5 wt % to about 2 wt %, or about 0.5 wt % to about 1.7 wt %, or about 0.5 wt % to about 1.5 wt %, or about 0.5 wt % to about 1.25 wt %, or about 0.5 wt % to about 1 wt %, or about 1 wt % to about 5 wt %, or about 1 wt % to about 4 wt %, or about 1 wt % to about 3 wt %, or about 1 wt % to about 2 wt %, or about 1 wt % to about 1.7 wt %, or about 1 wt % to about 1.5 wt %, or about 1 wt % to about 1.25 wt %, or about 0.75 wt % to about 1.25 wt %, or about 0.9 wt % to about 1.1 wt %.

However, photoinitiators that contain phosphorus or sulfur can in many cases reduce or even destroy the efficiency of a hydrosilylation catalyst (especially when the hydrosilylation catalyst contains platinum). Accordingly, it can be desirable in certain embodiments that the curable composition contain no more than 0.5 wt %, e.g., in some embodiments, no more than 0.3 wt %, or even no more than 0.2 wt % of phosphorus-containing photoinitiators and sulfur-containing photoinitiators. Here, too, combinations of photoinitiators can be used to provide the desirable curing properties; when a phosphorus- or sulfur-containing photoinitiator is used at a low level, in many embodiments the hydrosilylation catalyst will remain sufficiently active. For example, in the TPO/DMAPA combination described above, the TPO can be used at a high enough level to kick off the decomposition of the DMAPA when irradiated at 395 nm, but at a low enough level so as not to destroy the efficacy of the hydrosilylation initiator.

The photocurable composition as otherwise described herein also requires a hydrosilylation catalyst. The hydrosilylation catalyst can be any suitable catalyst that promotes the reaction between Si—H group and aliphatic ethylene group, such that the photocurable composition or the cured product thereof has the properties described herein. The hydrosilylation catalyst may be activated by thermal treatment or exposure to light. The hydrosilylation catalyst may be any catalyst comprising one or more platinum-group metals (i.e., platinum, rhodium, ruthenium, palladium, osmium and iridium). In certain embodiment, the hydrosilylation catalyst is a platinum catalyst. For example, thermally activated platinum catalysts include, but are not limited to, Karstedt's catalyst (platinum(0)-1,3-divinyl-1,1,3,3-tetramethyldisiloxane) or Speier's catalyst ($H_2PtCl_6$). Examples of light-activated platinum catalysts include, but are not limited to, platinum bis(β-diketonates) (such as Pt(acetylacetonate)$_2$, Pf(hexafluoroacetylacetone), and Pt(PPh$_3$)$_2$Cl$_2$), $\eta^5$-cyclopentadienyl trimethyl platinum(IV) complexes, platinum-triazenido complexes.

The hydrosilylation catalyst can also be a supported hydrosilylation catalyst comprising a solid support having a platinum-group metal on the surface thereof. Examples of supported catalysts include, but are not limited to, platinum on carbon, palladium on carbon, ruthenium on carbon, rhodium on carbon, platinum on silica, palladium on silica, platinum on alumina, palladium on alumina, and ruthenium on alumina. The hydrosilylation catalyst can also be an encapsulated catalyst, e.g., where a platinum-group metal is encapsulated in a resin, such as a thermoplastic resin.

The amount and concentration of the hydrosilylation catalyst is sufficient to catalyze the addition reaction between Si—H group and aliphatic ethylene group. For example, the hydrosilylation catalyst can be present as any suitable amount in the photocurable composition, such in an amount of about 0.001 to about 10 weight % based on the total weight of hydride-containing polysiloxane and vinyl-containing polysiloxane in the composition. In certain embodiments, the hydrosilylation catalyst is present in an amount of about 0.001 to about 5 weight % based on the total weight of the composition, e.g., about 0.001 wt % to about 4 wt %, or about 0.001 wt % to about 3 wt %, or about 0.001 wt % to about 2 wt %, or about 0.001 wt % to about 1.7 wt %, or about 0.001 wt % to about 1.5 wt %, or about 0.001 wt % to about 1 wt %, or about 0.1 wt % to about 5 wt %, or about 0.1 wt % to about 4 wt %, or about 0.1 wt % to about 3 wt %, or about 0.1 wt % to about 2 wt %, or about 0.1 wt % to about 1.7 wt %, or about 0.1 wt % to about 1.5 wt %, or about 0.1 wt % to about 1.25 wt %, or about 0.01 wt % to about 1 wt %, or about 0.1 wt % to about 1 wt %, or about 0.001 wt % to about 0.1 wt % based on the total weight of hydride-containing polysiloxane and vinyl-containing polysiloxane in the composition. In certain embodiments, the hydrosilylation catalyst may be sufficient to provide typically from about 0.1 to about 1000 ppm of one or more platinum-group metals, for example, from about 0.5 to about 100 ppm, or about 10 to about 50 ppm, or about 10 to about 30 ppm, or about 20 to about 30 ppm, based on the based on the total weight of hydride-containing polysiloxane and vinyl-containing polysiloxane in the composition.

The photocurable composition as otherwise described herein may also further comprise one or more fillers. One of skill in the art would be able to select the filler based on the need. For example, in certain embodiments, one or more fillers may be selected from ceramic particles, glass particles, metallic particles, polymeric particles, or a combination thereof. Non-limiting examples of fillers include one or more of silicon dioxide ($SiO_2$) compounds, such as fumed silica (i.e., amorphous silica having particle size of about 5-50 nm and a surface area of about 50-600 $m^2/g$), silica fume (or micro silica; i.e., amorphous silica having particle size of less than 1 μm, with average about 150 nm, and a surface area of about 15-30 $m^2/g$), fused quartz (or fused silica), perlite (i.e., an amorphous volcanic glass, which is mostly silica with some aluminum oxide), diatomaceous earth (i.e., silica rock having an average particle size of 10-200 μm), fly ash (i.e., coal combustion byproduct comprising amorphous and crystalline silica, $Al_2O_3$, $Fe_2O_3$, and $CaO$), slag or slag cement (i.e., byproduct of metal smelting comprising a mixture of silica and metal oxides), alumina, ceria, magnesium-magnesia aluminate (MMA), magnesium oxide, silicon nitride, silicon carbide, hydroxyapatite, cordierite, soda-lime glass, low iron glass, borosilicate glass, or a combination thereof. In certain embodiments, the filler is fumed silica. Nonreactive silicone resins can also be used as fillers; here, the silicone can be intermingled in the polymer matrix without being cured into it. The person of ordinary skill in the art can use such resins, based on the disclosure herein, to tune polymer properties.

The filler can have any suitable particle size, e.g., the longest dimension of the particle, such as the average longest dimension. For example, the filler can have a primary particle size of about 5 nm to about 100 nm, about 10 to about 30 nm, or about 5 nm or less, or about 50 nm or more, or about 100 nm or more. As used herein, "primary" particle size refers to the actual particles in their unagglomerated state, which can optionally agglomerate to form larger "secondary" particles.

The filler can be present as any suitable amount in the photocurable composition, such in an amount of about 0.1 wt % to about 30 wt % based on the total weight of the composition, for example in an amount of about 1 wt % to about 30 wt %, or about 2.5 wt % to about 30 wt %, or about 5 wt % to about 30 wt %, about 10 wt % to about 30 wt %, or about 0.1 wt % to about 20 wt %, or about 1 wt % to about 20 wt %, or about 2.5 wt % to about 20 wt %, or about 5 wt % to about 20 wt %, or about 0.1 wt % to about 15 wt %, or about 1 wt % to about 15 wt %, or about 2.5 wt % to about 15 wt %, or about 5 wt % to about 15 wt %, or about 0.1 wt % to about 10 wt %, or about 1 wt % to about 10 wt %, or about 2.5 wt % to about 10 wt %, or about 5 wt % to about 10 wt %, or about 0.1 wt % to about 8 wt %, or about 1 wt % to about 8 wt %, or about 2.5 wt % to about 8 wt %, or about 4 to about 8 weight %, or about 4 wt % to about 7 wt %, or about 4 wt % to about 6 wt %, or about 5 wt % to about 8 wt %, or about 5 wt % to about 7 wt %, or about 5 wt % to about 6 wt %, or about 4.5 wt % to about 7.5 wt %, or about 5.5 wt % to about 6.5 wt %.

In certain embodiments of the photocurable compositions as otherwise described herein, the first polysiloxane, the second polysiloxane, the third polysiloxane, any fourth polysiloxane, any reactive diluent, any filler, the photinitiator and the hydrosilylation catalyst are present in the composition in a total amount of at least 50 wt %, e.g., at least 60 wt %, at least 70 wt %, at least 80 wt %, at least 90 wt %, at least 95 wt %, or even at least 98 wt % of the composition.

The photocurable composition as otherwise described herein may also further comprise a solvent. Suitable solvents include, but are not limited to silicone-compatible organic solvents (such as toluene and xylene), silicone-containing fluids (such as octamethylcyclotetrasiloxane (D4) and decamethylcyclopentasiloxane (D5)), and combinations thereof. In certain embodiments, the solvent may be present in an amount of up to about 70 wt %, e.g., about 5 to about 70 weight % based on the total weight of the composition, e.g., about 5 wt % to about 60 wt %, or about 10 wt % to about 60 wt %, or about 20 wt % to about 60 wt %, or about 30 wt % to about 60 wt %, or about 5 wt % to about 30 wt %, or about 10 wt % to about 30 wt %, or about 5 wt % to about 20 wt %, or about 5 wt % to about 20 wt %, or about 5 wt % to about 20 wt %, or about 1 wt % to about 20 wt %, or about 1 wt % to about 10 wt %, or about 1 wt % to about 5 wt %. In certain particular embodiments of the photocurable composition as otherwise described herein, the solvent is present in the composition in an amount of about 20 wt % to about 60 wt %. Advantageously, based on the disclosure herein the person of ordinary skill in the art can tune the viscosity of the overall composition using the solvent, e.g., to lower the viscosity to a level as described elsewhere herein.

However, the present inventors have noted that suitable viscosity of the photocurable composition can be provided without using substantial amounts of solvent. Thus, in certain embodiments, of the photocurable composition as otherwise described herein comprises less than about 4 wt %, or less than about 3 wt %, or less than about 2 wt %, or less than about 1 wt %, or less than about 0.5 wt %, or less than about 0.1 wt %, or is essentially free of solvent.

The photocurable composition as otherwise described herein can further include a thermal peroxide initiator. Examples of such inhibitors include dicumyl peroxide, Trignox C, bis(2,4-dichlorobenzoyl)peroxide. Use of a thermal peroxide initiator can provide additional curing of vinyl groups during the thermal curing process, providing additional crosslinking to the material. The person of ordinary skill in the art can select a thermal peroxide initiator that does not substantially decompose during the UV curing process. Thermal peroxide initiators can be present in any effective amount, e.g., in the amount of 0.05-3% by weight of the composition.

The photocurable composition as otherwise described herein may also further comprise one or more additives. Non-limiting examples of additives can be additional inhibitors to prevent spontaneous polymerization (inert dyes), plasticizer, dispersing agents, debinding accelerators, pH regulators, a pharmaceutically active ingredient, or any combination thereof.

In certain especially desirable embodiments, the photocurable compositions of the disclosure have low viscosity. The use of the materials as claimed allows the person of ordinary skill in the art to provide low-viscosity curable compositions, while the particular combination of components allows the provision of cured materials having desirable properties. For example, in certain embodiments, one of skill may use the fourth polysiloxane, or one or more solvents, or any combination thereof to provide the photocurable compositions of the disclosure having the desired viscosity. In certain embodiments as otherwise described herein, the curable composition has a viscosity less than about 10,000 cSt at 25 C. Viscosity may be measured with DHR1 rheometer using the shear rate sweep experiment. For example, shear rate may range from 0.01/s to 1000/s. In certain embodiments, the photocurable compositions of the disclosure may exhibit Newtonian fluids behavior (i.e., viscosity doesn't change with shear rate). For example, in various embodiments as otherwise described herein, the photocurable composition has a viscosity at 25 C of less than 15,000 cSt, or less than 10,000 cSt, or less than 9,000 cSt, or less than 8,000 cSt, or even less than 7,000 cSt. In certain embodiments as otherwise described herein, the photocurable composition has a viscosity at 25 C of about 100 cSt to about 10,000 cSt, or about 100 cSt to about 8,000 cSt, or about 100 cSt to about 6,000 cSt, or about 100 cSt to about 5,000 cSt, or about 1,000 cSt to about 10,000 cSt, or about 1,000 cSt to about 8,000 cSt, or about 1,000 cSt to about 6,000 cSt, or about 1,000 cSt to about 5,000 cSt, or about 3,000 cSt to about 10,000 cSt, or about 3,000 cSt to about 8,000 cSt, or about 3,000 cSt to about 6,000 cSt, or about 3,000 cSt to about 5,000 cSt, or about 5,000 cSt to about 10,000 cSt, or about 5,000 cSt to about 9,000 cSt, or about 5,000 cSt to about 8,000 cSt, or about 5,000 cSt to about 7,000 cSt, or about 5,000 cSt to about 6,000 cSt. In certain embodiments as otherwise described herein, a photocurable composition of the disclosure has a viscosity of at least 50 cP at a shear rate of 5 Hz. And in certain embodiments as otherwise described herein, a photocurable composition of the disclosure has a viscosity of no more than 10,000 cP, no more than 5000 cP, or even no more than 1000 cP at a shear rate of 25 Hz.

Another aspect provides methods of forming a three-dimensional body comprising: providing a photocurable composition of the disclosure; and curing the photocurable composition with actinic radiation to form the three-dimensional body. Another aspect of the disclosure provides methods of forming a three-dimensional body comprising: providing a photocurable composition of the disclosure; curing the photocurable composition with actinic radiation to form a photocured three-dimensional body; and curing the photocured three-dimensional body with heat to form a heat-cured three-dimensional body.

One such method can be practice using an assembly configured for working with the photocurable compositions of the disclosure. As shown FIG. 1A, the assembly can have a computer controlled electromagnetic radiation unit (11), a chamber (12), and a construction unit (13). The electromagnetic radiation unit (11) can include a UV or visible light (14) emitting radiation source, for example, a laser or a light emitting diode (led) and may project a varying CAD/CAM created two-dimensional image onto a transparent window (15) at the bottom of the chamber (12). The chamber (12) can include a mixture (16) that can include the photocurable composition of the disclosure. The transparent window (15) of the chamber can also be semipermeable for an inhibitor gas or may include an additional semipermeable layer (not shown) for the penetration of an inhibitor, for example oxygen, into the mixture (16) of the chamber (12). During the forming process, the inhibitor may enter the chamber (12) by permeating the transparent window (15) and form an inhibition zone (17) at a bottom region of the mixture (16). In the inhibition zone (17) the inhibitor can limit or prevent curing of the mixture (16) by the electromagnetic radiation.

According to one embodiment, a carrier plate (18) can be positioned above the chamber (12). The position between the carrier plate (18) and the mixture in the chamber (12) can be changed during the forming process to facilitate formation of the three-dimensional body. When the formation of the three-dimensional body is started, the carrier plate (18) can be emerged into the mixture (16) up to a pre-calculated distance from the interface of the inhibition zone (22). In some embodiments, the pre-calculated distance corresponds to a portion of the composition that can be radiation cured (translated from liquid to solid state) if subjected to electromagnetic radiation from the radiation unit (11) underneath the chamber (12), and is herein called "translating portion" (19). The radiation cured translating portion (19) can adhere to the carrier plate (18) and be vertically moved away from the interface of the inhibition zone (22). Concurrently with the upwards movements of the carrier plate (18) and the attached solidified translating portion (19), mixture (16) from the sides of the polymerization chamber or from a reservoir (20) can fill the released space. The construction is designed to move the carrier plate (18) continuously upwards in z direction at a speed that corresponds to the time needed for curing the mixture (16) that replaces the upwards moved solidified translating portion. FIG. 1B provides one embodiment having a partially formed three-dimensional body (21) having three solidified and unified translating portions and one translating portion (19) which is subjected to curing and attached to the three-dimensional body (21). The increase in distance between the carrier plate (18) and the mixture (16) when forming the three-dimensional body (21) can be caused by moving either the carrier plate (18) or the chamber (12) or both carrier plate (18) and chamber (12) in relation to each other.

The carrier plate (18) of the assembly of the present disclosure is configured for continuous movement to facilitate formation of the three-dimensional body away from the interface of the inhibition zone (22). As used herein, the phrase "interphase of the inhibition zone" (22) can be used interchangeable with the phrase "interface of the mixture," since the inhibition zone is a zone of the mixture, which only distinguishes from the other part of the mixture by the presence of an inhibitor in a concentration that the mixture may not cure if exposed to electromagnetic radiation. Actual solidification and forming of the three dimensional body starts at the interface of the inhibition zone (22), i.e., an interface of the mixture.

The formation of the three dimensional body may not necessarily be considered a layer-by-layer forming process. Instead, the forming process (e.g., curing) may be in the form of a gradient of solidification (e.g., polymerization). The processes of the embodiments herein may facilitate formation of a three-dimensional body having smoother features and may have improved mechanical properties, compared to conventional structures formed by layer-by-layer forming processes.

As used in the context of the present disclosure, continuous translation and growth of the three-dimensional body means that the carrier plate (18) can be moved in a continuous manner or in discrete steps with short stops between each step, as long the stops allow that a gradient of solidification is maintained while forming the three-dimensional body. A gradient of solidification means that especially in the translating portion (19) a continuous polymerization reaction is maintained, with the highest degree of solidification at the farthest distance to the inhibition zone. The three-dimensional body formed by the process of continuous translation can thereby possess a non-layered internal structure, such that in a crosscut along the z-axis, changes in the morphology of the green body are not visible to the naked eye. In comparison, traditional layer by layer build-up of a green body waits until one layer is completely radiation cured before the next layer is applied, which leaves visible cleavage lines in the formed green body, i.e., regions that are not smoothly connected together.

In embodiments, the stops in the movement of the carrier plate (18) while conducting continuous translation and forming of the three-dimensional body can be at least about 1 microsecond, such as at least about 300 microseconds, at least about 500 microseconds, at least about 800 microseconds, or at least about 1000 microseconds. In other embodiments, the stops during continuous translation may be not longer than about 1 second, such as not longer than about 0.5 seconds, not longer than about 0.3 seconds, not longer than about 0.2 seconds, or not longer than about 0.1 seconds. It will be appreciated that the stops during continuous translation can be a value within any of the minimum and maximum values note above, such as from about 1 microsecond to about 1 second, from about 300 microseconds to about 0.5 seconds, or from about 1000 microseconds to about 0.1 seconds.

In certain embodiments, the method of the present disclosure can also include one or more longer stops during the forming of the three-dimensional body, such that the gradient of solidification may be interrupted and the translation is not continuous as defined above. Such longer stops may be desired for the making of a body having defined regions which are cleavable.

The cure depth of the electromagnetic radiation (14) applied to the mixture (16) may be effected by the size, type, and concentration of the fillers and the refractive index of the slurry. Notably, the size and concentration of the fillers may be particularly selected to facilitate proper operation of the process in combination with the type of radiation used for the curing process.

According to an embodiment, suitable formation of a three-dimensional body having a suitable strength, can include controlling the cure depth relative to a thickness of the translating portion. In one embodiment, the cure depth may be at least about 25% larger than the thickness of the translating portion (19), such as at least about 30%, at least about 35%, or at least about 40% larger. In another embodiment, the cure depth can be not greater than about 75% of the thickness of the translating portion (19), such as not greater than about 70% or not greater than about 65%. It will be appreciated that the cure depth can be a value between any of the maximum and minimum values noted above, such as from about 25% to about 75%, from about 30% to about 70% or from about 35% to about 60% of the thickness of the translating portion (19).

In certain embodiment, a thickness of the translating portion (19) can be at least about 50 μm, such as at least about 70 μm, or at least about 100 μm. In certain embodiment, the thickness of the translating portion may be not greater than about 500 μm, such as not greater than about 450 μm, or not greater than about 400 μm. It will be appreciated that the thickness of the translating portion can be a value between any of the maximum and minimum values note above, such as from about 50 μm to about 500 μm, from about 80 μm to about 450 μm, or from about 100 μm to about 300 μm.

In some embodiments, the cure depth may be at least about 1 μm larger than the thickness of the inhibition zone (17), such as at least about 5 μm, at least about 10 μm, at least about 20 μm, or at least about 50 μm larger than the thickness of the inhibition zone. In yet another aspect, the cure depth can be not greater than about 400 μm than the thickness of the inhibition zone, such as not greater than about 350 μm, not greater than about 300 μm, or not greater than about 250 μm than the thickness of the inhibition zone. It will be appreciated that the cure depth can be a value between any of the maximum and minimum values noted above, such as within a range of at least about 1 μm to not greater than about 400 μm, from about 5 μm to about 370 μm, or from about 30 μm to about 300 μm larger than the thickness of the inhibition zone.

The thickness of the inhibition zone (17), which can be formed when the inhibitor enters the chamber (12) through the transparent and semipermeable window, (15) may be regulated by the concentration of the inhibitor. The inhibition zone (17) may limit the curing of the mixture (16) in that zone within the chamber (12). The inhibition zone (17) may facilitate limited or no adhesion of the radiation cured material to the bottom of the chamber (12), which may further facilitate simpler release of the body from the chamber after forming is completed.

Figure 2:
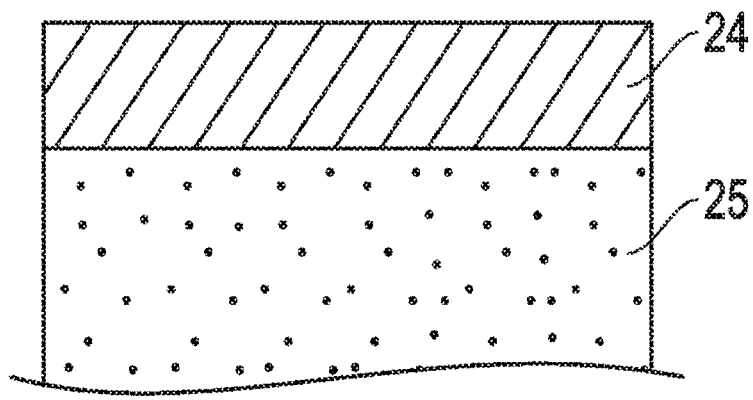
FIG. 2 is an illustration of a bottom portion of the apparatus according to one embodiment useful in methods of the disclosure. In (A), the transparent window (24) functions also as a semipermeable layer for the penetration of the inhibitor gas (25), penetrating the transparent window (24) from the bottom of the chamber; and in (B) an additional semipermeable layer (26) is installed above the transparent window (24) and the inhibitor gas (25) is provided from the sides of the polymerization chamber.
Figure 2:
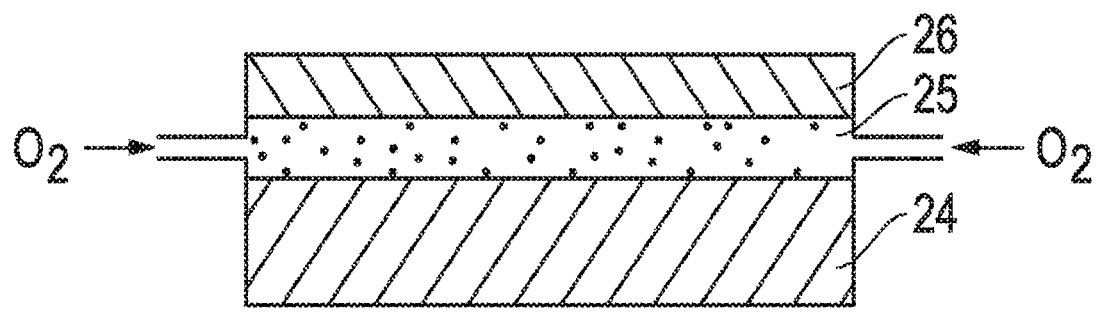

FIGS. 2A and 2B show embodiments how a semipermeable layer can be integrated at the bottom section of the chamber. In the embodiment of FIG. 2A, the transparent window (24) functions also as a semipermeable layer for the penetration of the inhibitor gas (25), penetrating the transparent window (24) from the bottom of the chamber. FIG. 2B shows an embodiment where an additional semipermeable layer (26) is installed above the transparent window (24) and the inhibitor gas (25) is provided from the sides of the polymerization chamber.

In one embodiment, the thickness of the semipermeable layer for the penetration of inhibitor gas can be at least about 1 μm, such as at least about 5 μm, at least about 50 μm, at least about 500 μm, or at least about 1000 μm. The upper thickness of the semipermeable layer may not be limited as long the layer allows sufficient transport of inhibitor gas.

The material of the semipermeable layer may be any material that permits the penetration of inhibitor gas. Non-limiting examples of materials suitable for a semipermeable layer can include, for example, fluoropolymers, such as Teflon (e.g., AF-2400X), polymethylpentene based membranes (PMP), or silicone polymers and copolymers.

The inhibitor may preferably be an oxygen containing gas, such as air, mixtures of an inert gas and oxygen, or pure oxygen. In another aspect, when oxygen cannot inhibit the activity of the photoinitiator (for example, when a cationic photoinitiator is used) the inhibitor can be an amine, e.g., ammonia, ethyl amine, di- and trialkyl amines, carbon dioxide, or combinations thereof. In certain embodiments, the inhibitor can be pure oxygen, and the oxygen may penetrate the semipermeable layer in an amount of at least about 0.1 Barrer, such as at least about 1 Barrer, at least about 5 Barrer, at least about 10 Barrer, or at least about 30 Barrer.

The thickness of the inhibition zone may be at least about 0.5 μm, such as at least about 1.0 μm, at least about 2.0 μm, or at least about 5 µm, or not be greater than about 600 µm, such as not greater than about 500 µm, not greater than about 300 µm, or not greater than about 100 µm. It will be appreciated that the thickness of the inhibition zone can be a value between any of the maximum and minimum values noted above, such as from about 0.5 µm to about 600 µm, from about 1.0 µm to about 450 µm, or from about 3 µm to about 200 µm. In some embodiments, polymerization reactions can also occur to a limited extent in the inhibition zone. The inhibition zone may be also described as a gradient of polymerization, where with increasing distance from the bottom surface of the chamber larger amounts of polymerization reactions can happen, but these polymerization reactions may not completely cure the mixture, and the mixture is still maintained in a liquid stage. The interface of the inhibition zone may be understood as the area of the inhibition zone where the polymerization reactions start to form a solid material.

In one embodiment, the method of the present disclosure is characterized that a three-dimensional body can be continuously manufactured at a high production speed. In one embodiment, the creating of the three dimensional body can be completed at a speed rate of at least about 25 mm/hr, such as at least about 30 mm/hr, or at least about 40 mm/hr, or at least about 50 mm/hr, or at least about 70 mm/hr.

While the disclosure above relates generally to certain continuous 3D-printing processes, the person of ordinary skill in the art will appreciate that a wide variety of processes, can be used to form articles from the photocurable compositions described herein. For example, in certain embodiments, other UV-based 3D-printing platforms can be used, for example, stereolithography and digital light projector-based methods.

In some embodiments, the radiation can be created by a laser, or a light emitting diode (led). An electron beam can alternatively be used to cure the compositions described herein.

In some embodiments, the radiation applied for curing the mixture can have an energy of at least about 20 mJ/cm$^2$, such as at least about 30 mJ/cm$^2$, at least about 50 mJ/cm$^2$, or at least about 80 mJ/cm$^2$, or not greater than about 450 mJ/cm$^2$, such as not greater than about 400 mJ/cm$^2$, not greater than about 350 mJ/cm$^2$, not greater than about 300 mJ/cm$^2$, not greater than about 250 mJ/cm$^2$, not greater than about 200 mJ/cm$^2$, or not greater than about 100 mJ/cm$^2$, or from about 20 mJ/cm$^2$ to about 450 mJ/cm$^2$, or from about 30 mJ/cm$^2$ to 300 mJ/cm$^2$, or from about 40 mJ/cm$^2$ to about 200 mJ/cm$^2$, or from about 20 mJ/cm$^2$ to about 100 mJ/cm$^2$.

In some embodiments, the method of the present disclosure may cure the mixture (e.g., in the translation portion (19) during continuous forming of the three dimensional body) at a UV power of at least 0.1 mW/cm$^2$, such as at least 0.5 mW/cm$^2$, at least 1.0 mW/cm$^2$, or at least 3.0 mW/cm$^2$, or not greater than 250 mW/cm$^2$, such as not greater than 150 mW/cm$^2$, or not greater than mW/cm$^2$, or not greater than 50 mW/cm$^2$, or not greater than 30 mW/cm$^2$, or not greater than 20 mW/cm$^2$, or not greater than 13.0 mW/cm$^2$, or not greater than 12 mW/cm$^2$, or not greater than 10 mW/cm$^2$. It will be appreciated that the applied UV power can be a value between any of the maximum and minimum values noted above, such as from 0.1 mW/cm$^2$ to 250.0 mW/cm$^2$, or from 1.0 mW/cm$^2$ to 100 mW/cm$^2$, or from 2.0 mW/cm$^2$ to 10 mW/cm$^2$.

The three-dimensional body can be subjected a heat-curing process, for example, to allow the thermally-initiated portion of the crosslinking to proceed (e.g., hydrosilylation, cure of vinyl groups through thermal initiation). A variety of heating procedures can be used. For example, in certain embodiments, the three-dimensional body is heated a a temperature in the range of 80-200 C, e.g., 80-170 C, or 80-140 C, or 100-200 C, or 100-170 C, or 100-140 C. The time can vary widely depending, e.g., on temperature and on the amount of any solvent present. Times in the range of, for example, 2-72 hours can be used. A vacuum oven or a flow of air can be helpful in dissipating uncured volatile components (e.g., solvent). Accordingly, the body can be only partially cured during the exposure to radiation, then substantially fully cured during the heat treatment.

The three-dimensional body may be further subjected (with or without an intermediate lower temperature heating) to high temperature sintering to decompose the cured photocurable composition and to form a sintered body. If the solid particles of three dimensional body subjected to high temperature sintering are ceramic particles, the sintered body is called hereafter a ceramic body. The sintering temperature can be at least 900° C., such as at least 950° C., or at least 1000° C., or at least 1050° C., or at least 1100° C., or at least 1150° C. In other aspects, the sintering temperature can be not greater than 1600° C., such as not greater than 1550° C., or not greater than 1500° C., or not greater than 1400° C. It will be appreciated that the sintering temperature can be a value between any of the minimum and maximum values noted above, such as from 900° C. to 1600° C., or from 1000° C. to 1500° C., or from 1100° C. to 1350° C.

Certain aspects of the disclosure are now explained further via the following non-limiting examples.

EXAMPLES

General Procedure: Formulation

Polysiloxanes, photo-initiator and hydrosilyation catalyst were added to a glass container. Optionally, a filler, dye, and/or solvent were also added to the mixture. A mechanical mixer was then used to stir the photocurable composition mixture at a rate of about 2000 rpm at room temperature until no agglomerates are visible. During the mixing, the glass container is kept at a temperature of below 40° C. by external cooling.

To evaluate its physical properties, the prepared photocurable composition mixture may be poured into an aluminum pan, and the pan is placed into a UV chamber with irradiation at 365 nm for 5 mins under $N_2$ flush. The irradiation time may be extended depending on the formulation, the thickness of the sample, etc. The photocured composition mixture was then placed into oven at 140° C. for several hours.

General Procedure: Printing

The continuous 3-D printer (Envisiontec CDLM 3D printer) was calibrated and prepared for printing. First, a test run was performed without any photocurable composition to ensure that the printer is running properly. Then, at least 30 mL of the photocurable composition was poured into the clean tray and the clean build platform head was attached, ensuring that the ventilation outlet is in proper position. Printing then commenced. When the printing was finished, the build platform head was removed from the printer using a spatula to carefully scrape off the printed object. The surface of the printed object was washed with isopropanol, and post-thermal cure was applied.

Example 1

A photocurable composition of the disclosure was prepared according to the general procedure provided above. The materials used are outlined in Table 1 below.

TABLE 1

| Materials | Product chemical structure and commercial sources | wt % |
|---|---|---|
| First polysiloxane | 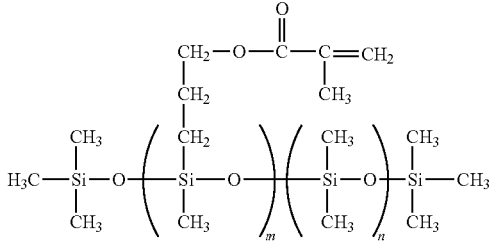<br>Gelest[1] RMS-083, DMS-R22, DMS-31 | 7-16 |
| Second polysiloxane<br>Third polysiloxane<br>Filler<br>hydrosoliylation catalyst | Dow corning shore A 50 two parts with fumed silica and Pt catalyst | 24-44 |
| Fourth polysiloxane | 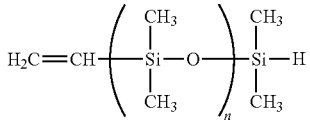<br>Gelest DMS-HV15, DMS-22 | 12-45 |
| Solvent | toluene, octamethylcyclotetrasiloxane (D4), or decamethylcyclopentasiloxane (D5) | 7-37 |
| Photo-initiator | 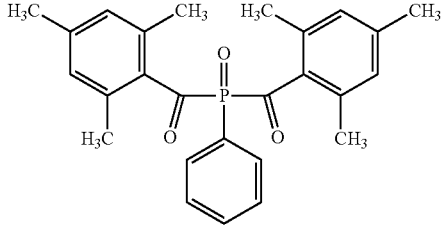<br>Irgacure 819[2] | <1 |
| Additive | Silicone dye (GSDI Silicogum Red 324[3]) | <1 |

[1]Gelest brand silicones available from Gelest (Morrisville, Pennsylvania)
[2]available from Sigma-Aldrich Corp. (St. Louis, Missouri)
[3]available from PolyOne Corp. (Avon Lake, Ohio)

The photocurable composition had a viscosity of about 5000 to about 8000 cst. This composition was then used in 3-D printing according to the general procedure provided.

Figure 3:
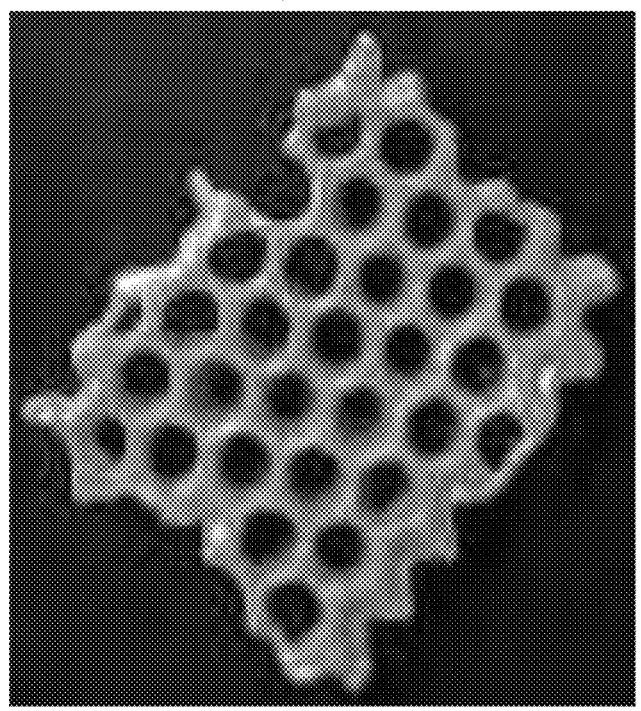
FIG. 3 is a photograph of a three-dimensional article printed from the photocurable composition of Example 1.
Figure 3:
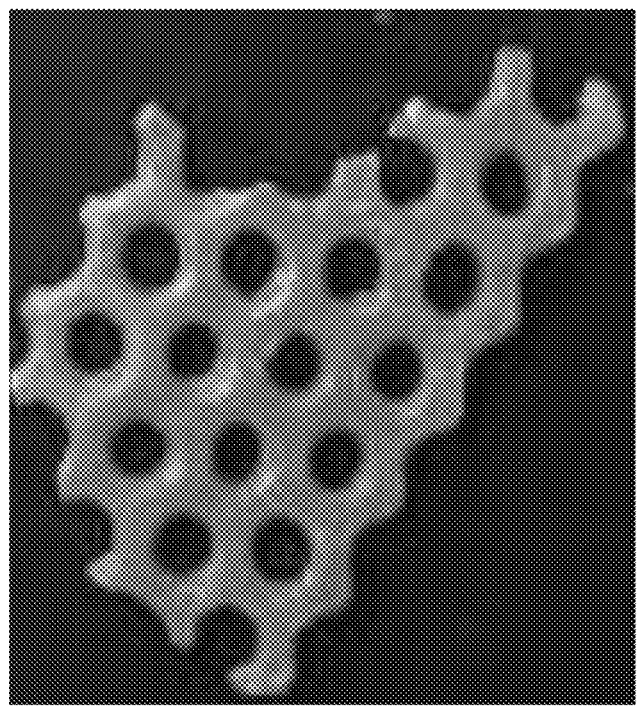

The printed articles, illustrated in FIG. 3, had elasticity of more than 200% and Shore (Durometer) A hardness of about 25 to about 28. The printed article also had 5 wt % thermal degradation at 425° C.

Figure 4:
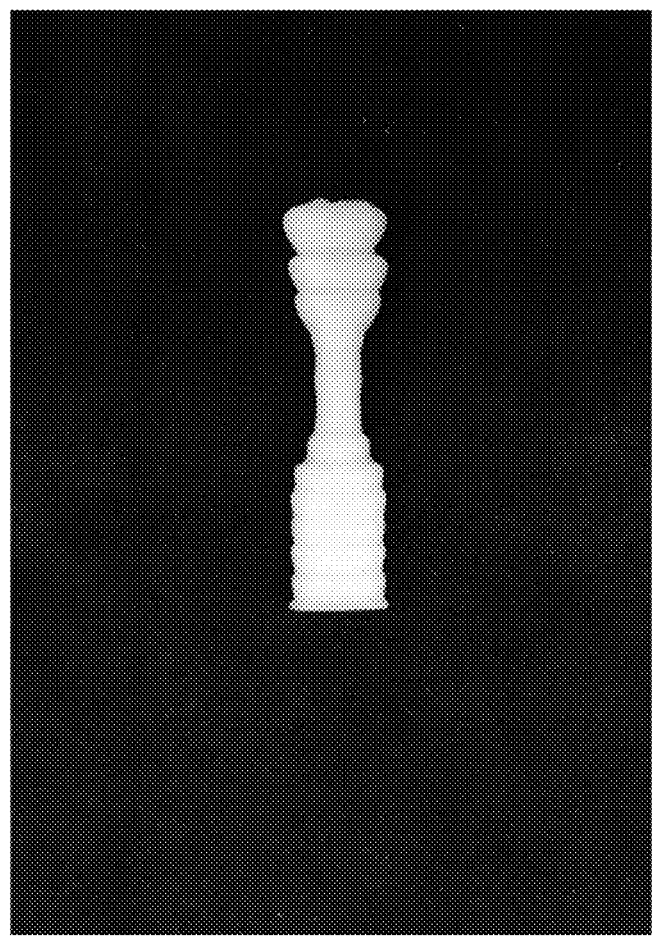
FIG. 4 is a photograph of another three-dimensional article printed from a photocurable composition of the disclosure.

FIG. 4 is a photograph of another article 3D-printed using a photocurable composition of the disclosure.

Example 2

A photocurable composition of the disclosure was prepared according to the general procedure provided above. The materials used are outlined in Table 2 below. While a UV-active platinum catalyst is used, the inventors believe that only a minor amount of hydrosilylation occurs upon exposure to radiation.

TABLE 2

| Materials | Product chemical structure and commercial sources | parts |
|---|---|---|
| First polysiloxane | (structure shown: methacryloxypropyl-functional polydimethylsiloxane)  Gelest[1] RMS-083 | 40 |
| First polysiloxane | METHACRYLOXYPROPYL TERMINATED POLYDIMETHYLSILOXANE, 50-90 cSt, Gelest DMS-R18 | 40 |
| Second polysiloxane Third polysiloxane Silica filler Hydrosilylation catalyst | Dow QP-270: Part A (60 parts); Part B (60 parts) | 120 |
| Fourth polysiloxane | (structure shown: vinyl/Si-H terminated polydimethylsiloxane)  Gelest DMS-HV15 | 150 |
| Hydrosilylation catalyst | UV-LSR Pt catalyst (in silicone oil) | 4 |
| Hydrosilylation catalyst | Gelest DMS-HV15 Pt catalyst (in silicone oil) | 1.5 |
| Photoinitiator | TPO | 0.8 |
| Photoinitiator | DMAPA | 3.2 |

[1]Gelest brand silicones available from Gelest (Morrisville, Pennsylvania)
[2]available from Sigma-Aldrich Corp. (St. Louis, Missouri)
[3]available from PolyOne Corp. (Avon Lake, Ohio)

The formulations of Table 1 and Table 2 were cured via UV curing followed by thermal curing as described herein. The cured material of Table 1 had a tensile strength of 0.5 MPa, a strain at break of 420%, and a Shore A Hardness of 27. The cured material of Table 2 had a tensile strength of 2.0 MPa, a strain at break of 550%, and a Shore A Hardness of 30. Mechanical data were determined according to ASTM D638.

Other aspects of the disclosure provide the following numbered embodiments, which can be combined in any logically and technically consistent manner.

Embodiment 1

A photocurable composition, comprising:
a first polysiloxane comprising at least about two acrylate or methacrylate groups per molecule;
a second polysiloxane containing at least one (e.g., at least about two) Si—H group per molecule;
a third polysiloxane containing at least one (e.g., at least about two) reactive aliphatic ethylene group per molecule;
a free radical photoinitiator in an amount of about 0.01 to about 10 weight % based on the total weight of (meth)acrylate-containing polysiloxane in the composition; and
a hydrosilylation catalyst in an amount of about 0.001 to about 10 weight % based on the total weight of hydride-containing polysiloxane and vinyl-containing polysiloxane in the composition.

Embodiment 2

A photocurable composition of embodiment 1, wherein the first polysiloxane has about two acrylate or methacrylate groups per polysiloxane molecule.

Embodiment 3

A photocurable composition of embodiment 1, wherein the first polysiloxane has more than about two acrylate or methacrylate groups per polysiloxane molecule.

Embodiment 4

A photocurable composition of any of embodiments 1-3, wherein the first polysiloxane is poly(dimethylsiloxane-co-(methacryloxypropyl)methylsiloxane) or methacryloxypropyl terminated poly(dimethylsiloxane).

Embodiment 5

A photocurable composition of any of embodiments 1-4, wherein the first polysiloxane has a $M_w$ of less than about 50,000 g/mol, e.g., less than about 20,000 g/mol.

Embodiment 6

A photocurable composition of any of embodiments 1-5, wherein the first polysiloxane is present in the photocurable composition in an amount of about 1 wt % to about 50 wt %, e.g., about 10 wt % to about 50 wt %.

Embodiment 7

A photocurable composition of any of embodiments 1-6, wherein the second polysiloxane has at least 1.75 Si—H groups per molecule, or at least 1.9 Si—H groups per molecule.

Embodiment 8

A photocurable composition of any of embodiments 1-7, wherein the second polysiloxane is present in the composition in an amount of about 1 wt % to about 80 wt %, e.g., in an amount of about 15 wt % to about 40 wt %.

Embodiment 9

A photocurable composition of embodiment any of embodiments 1-8, wherein the second polysiloxane has a molecular weight of about 1,000 g/mol to about 1,000,000 g/mol, or about 100,000 g/mol to about 1,000,000 g/mol.

Embodiment 10

A photocurable composition of any of embodiments 1-9, wherein the third polysiloxane has at least 1.75 reactive aliphatic ethylene groups per molecule, or at least 1.9 reactive aliphatic ethylene groups per molecule.

Embodiment 11

A photocurable composition of any of embodiments 1-10, wherein the third polysiloxane is present in the composition in an amount of about 1 wt % to about 80 wt %, e.g., in an amount of about 15 wt % to about 40 wt %.

Embodiment 12

A photocurable composition of any of embodiments 1-11, wherein the third polysiloxane has a molecular weight of about 1,000 g/mol to about 1,000,000, or about 100,000 g/mol to about 1,000,000.

Embodiment 13

A photocurable composition of any of embodiments 1-12, wherein each reactive aliphatic ethylene group of the third polysiloxane is not a (meth)acrylate.

Embodiment 14

A photocurable composition of any of embodiments 1-13, wherein the second polysiloxane and the third polysiloxane are present in the composition in a total amount of about 1 wt % to about 80 wt %, e.g., in an amount of about 15 wt % to about 40 wt %.

Embodiment 15

A photocurable composition of any of embodiments 1-14, wherein the second and third polysiloxane are provided together, e.g., as part of a curable liquid silicone rubber (LSR) or liquid injection molding silicone (LIMS) formulation.

Embodiment 16

A photocurable composition of any of embodiments 1-14, wherein the second and third polysiloxane are provided separately.

Embodiment 17

A photocurable composition of any of embodiments 1-16, wherein the first polysiloxane, the second polysiloxane, the third polysiloxane, the photoinitiator and the hydrosilylation catalyst are present in the composition in a total amount of at least 50 wt %, e.g., at least 60 wt %, at least 70 wt %, at least 80 wt %, at least 90 wt %, at least 95 wt %, or even at least 98 wt % of the composition.

Embodiment 18

A photocurable composition of any of embodiments 1-17, wherein the first polysiloxane is present in the composition in an amount in the range of about 20 wt % to about 80 wt %; and the second polysiloxane and the third polysiloxane are present in the composition in a total amount in the range of about 20 wt % to about 80 wt %.

Embodiment 19

A photocurable composition of any of embodiments 1-18, wherein the composition further comprises a fourth polysiloxane comprising at least about one aliphatic ethylene group and at least about one Si—H group per molecule having a molecular weight of less than about 100,000 g/mol.

Embodiment 20

A photocurable composition of embodiment 19, wherein the fourth polysiloxane is α-monovinyl-ω-monohydride terminated poly(dimethylsiloxane).

Embodiment 21

A photocurable composition of embodiment 19 or embodiment 20, wherein the fourth polysiloxane has in the range of about 1 to about 20 mol % aliphatic ethylene groups and about 1 to about 20 mol % Si—H groups.

Embodiment 22

A photocurable composition of any of embodiments 19-21, wherein the fourth polysiloxane has a $M_W$ of less than about 100,000 g/mol, e.g., less than about 50,000 g/mol, or less than about 20,000 g/mol.

Embodiment 23

A photocurable composition of any of embodiments 19-22, wherein the fourth polysiloxane is present in an amount in the range of about 1 wt % to about 50 wt %, or about 1 wt % to about 20 wt %, or about 5 wt % to about 30 wt %.

Embodiment 24

A photocurable composition of any of embodiments 1-23, further comprising one or more monofunctional reactive diluents in the photocurable composition, e.g., in an amount up to about 30 wt %, or up to about 20 wt % of the composition.

Embodiment 25

A photocurable composition of any of embodiments 1-24, wherein the photoinitiator is bis(2,4,6-trimethylbenzoyl)-phenylphosphineoxide, bis-(4-Methoxybenzoyl)diethylgermanium, or p-(octyloxyphenyl)-phenyliodonium hexafluoroantimonate.

Embodiment 26

A photocurable composition of any of embodiments 1-24, wherein the photoinitiator is 1-phenyl-1,2-propanedione.

Embodiment 27

A photocurable composition of any of embodiments 1-24, wherein the photoinitiator is provided as a plurality of photoinitiators (e.g., two photoinitiators).

Embodiment 28

A photocurable composition of any of embodiments 1-24, wherein the photoinitiator includes a first photoinitiator having an absorption at least 2 times (e.g., at least 5 times, or at least 10 times) that of a second photoinitiator at 380 nm.

Embodiment 29

A photocurable composition of any of embodiments 1-24, wherein the photoinitiator includes a first photoinitiator having an absorption at least 2 times (e.g., at least 5 times, or at least 10 times) that of a second photoinitiator at 390 nm.

Embodiment 30

A photocurable composition of any of embodiments 1-24, comprising TPO as a first photoinitiator and DMAPA as a second photoinitiator.

Embodiment 31

A photocurable composition of any of embodiments 1-30, wherein the photoinitiator is present in an amount of about 0.2 to about 2 weight % based on the total weight of (meth)acrylate-containing polysiloxane in the composition.

Embodiment 32

A photocurable composition of any of embodiments 1-31, containing no more than 0.5 wt %, e.g., no more than 0.3 wt %, or even no more than 0.2 wt % of phosphorus-containing photoinitiators and sulfur-containing photoinitiators.

Embodiment 33

A photocurable composition of any of embodiments 1-32, further comprising a thermal peroxide initiator.

Embodiment 34

A photocurable composition of any of embodiments 1-33, wherein the hydrosilylation catalyst is a platinum catalyst.

Embodiment 35

A photocurable composition of any of embodiments 1-34, further comprising a filler.

Embodiment 36

A photocurable composition of embodiment 35, wherein the filler is selected from ceramic particles, glass particles, metallic particles, polymeric particles, or a combination thereof.

Embodiment 37

A photocurable composition of any of embodiments 1-36, wherein the first polysiloxane, the second polysiloxane, the third polysiloxane, any fourth polysiloxane, any reactive diluent, any filler, the photoinitiator, and the hydrosilylation catalyst are present in the composition in a total amount of at least 50 wt %, e.g., at least 60 wt %, at least 70 wt %, at least 80 wt %, at least 90 wt %, at least 95 wt %, or even at least 98 wt % of the composition.

Embodiment 38

A photocurable composition of any of embodiments 1-37, wherein the molar ratio of Si—H to reactive aliphatic ethylene in the photocurable composition is in the range of 3:2 to 2:3, e.g., 5:4 to 4:5, or 9:8:8:9.

Embodiment 39

A photocurable composition of any of embodiments 1-38 further comprising a solvent, e.g., selected from toluene, octamethylcyclotetrasiloxane (D4), decamethylcyclopentasiloxane (D5), and combinations thereof.

Embodiment 40

A photocurable composition embodiment 39, wherein the solvent is present in an amount of about 5 to about 40 weight % based on the total weight of the composition.

Embodiment 41

A photocurable composition of any of embodiments 1-40, having a viscosity of at least 50 cP at a shear rate of 5 Hz.

Embodiment 42

A photocurable composition of any of embodiments 1-41, having a viscosity of no more than 1000 cP at a shear rate of 25 Hz.

Embodiment 43

A photocurable composition of any of embodiments 1-42, having a viscosity of less than about 10,000 cSt at 25° C.

Embodiment 44

A method of forming a body comprising providing a photocurable composition according to any of embodiments 1-43; and curing the photocurable composition with actinic radiation to form a photocured three-dimensional body.

Embodiment 45

A method of embodiment 44 further comprising curing the photocured three-dimensional body with heat to form a heat-cured three-dimensional body.

Embodiment 46

The method according to embodiment 44 or embodiment 45, wherein the curing with actinic radiation is performed to as to include continuous translation and growth of the body from an interface of the mixture.

Embodiment 47

The method according to any of embodiments 44-46, wherein the curing with actinic radiation is performed by continuously creating and attaching a radiation cured translating portion to a carrier plate and increasing a distance between the carrier plate and the mixture in a continuous manner to create a three-dimensional body within the mixture, wherein during forming the three-dimensional body is adjacent to an interface of the mixture.

Embodiment 48

The method according to any of embodiments 44-47, wherein the radiation has a wavelength in the range of 360 nm to 450 nm.

Embodiment 49

The method according to any of embodiments 44-47, wherein the radiation has a peak wavelength of at least 370 nm, e.g., at least 380 nm or even at least 390 nm.

Embodiment 50

The method according to any of embodiments 44-40, wherein the radiation has a peak wavelength in the range of 370-450 nm, e.g., 380-450 nm, or 390-450 nm.

Embodiment 51

The method according to any of embodiments 44-50, wherein the radiation has an energy from about 20 mJ/cm$^2$ to about 450 mJ/cm$^2$.

Embodiment 52

The method according to any of embodiments 44-51, wherein the forming is conducted at a forming speed of at least 25 mm/hr.

It is understood that the examples and embodiments described herein are for illustrative purposes only and that various modifications or changes in light thereof will be suggested to persons skilled in the art and are to be incorporated within the spirit and purview of this application and scope of the appended claims. All publications, patents, and patent applications cited herein are hereby incorporated herein by reference for all purposes.

We claim:

1. A photocurable composition, comprising:
   a first polysiloxane comprising at least about two acrylate or methacrylate groups per molecule, wherein the first polysiloxane is present in an amount of about 7 wt % to about 50 wt %;
   a second polysiloxane containing at least one Si—H group per molecule, wherein the second polysiloxane is present in an amount of about 10 wt % to about 60 wt %;
   a third polysiloxane containing at least one reactive aliphatic ethylene group that is not a (meth)acrylate per molecule, wherein the third polysiloxane is present in an amount of about 10 wt % to about 60 wt %, wherein each reactive aliphatic ethylene group of the third polysiloxane is not a (meth)acrylate;
   a free radical photoinitiator in an amount of about 0.01 to about 10 weight % based on the total weight of (meth)acrylate-containing polysiloxane in the composition; and
   a hydrosilylation catalyst in an amount of about 0.001 to about 10 weight % based on the total weight of hydride-containing polysiloxane and vinyl-containing polysiloxane in the composition.

2. A photocurable composition of claim 1, wherein the first polysiloxane is poly(dimethylsiloxane-co-(methacryloxypropyl)methylsiloxane) or methacryloxypropyl terminated poly(dimethylsiloxane).

3. A photocurable composition of claim 1, wherein the second polysiloxane has at least 1.75 Si—H groups per molecule.

4. A photocurable composition of claim 1, wherein the third polysiloxane has at least 1.75 reactive aliphatic ethylene groups per molecule.

5. A photocurable composition of claim 1, wherein the composition further comprises a fourth polysiloxane comprising at least about one aliphatic ethylene group and at least about one Si—H group per molecule having a molecular weight of less than about 100,000 g/mol.

6. A photocurable composition of claim 1, further comprising one or more monofunctional reactive diluents in the photocurable composition, e.g., in an amount up to about 30 wt %, or up to about 20 wt % of the composition.

7. A photocurable composition of claim 1, wherein the photoinitiator includes a first photoinitiator having an absorption at least 5 times that of a second photoinitiator at 380 nm.

8. A photocurable composition of claim 1, comprising TPO as a first photoinitiator and DMAPA as a second photoinitiator.

9. A photocurable composition of claim 1, wherein the photoinitiator is present in an amount of about 0.2 to about 2 weight % based on the total weight of (meth)acrylate-containing polysiloxane in the composition.

10. A photocurable composition of claim 1, containing no more than 0.2 wt % of phosphorus-containing photoinitiators and sulfur-containing photoinitiators.

11. A photocurable composition of claim 1, further comprising a thermal peroxide initiator.

12. A photocurable composition of claim 1, wherein the hydrosilylation catalyst is a platinum catalyst.

13. A photocurable composition of claim 1, wherein the first polysiloxane, the second polysiloxane, the third polysiloxane, any fourth polysiloxane, any reactive diluent, any filler, the photoinitiator, and the hydrosilylation catalyst are present in the composition in a total amount of at least 90 wt % of the composition.

14. A photocurable composition of claim 1, wherein the molar ratio of Si—H to reactive aliphatic ethylene in the photocurable composition is in the range of 3:2 to 2:3.

15. A photocurable composition of claim 1, having a viscosity of less than about 10,000 cSt at 25° C.

16. A photocurable composition of claim 1, wherein the first polysiloxane is present in the composition in an amount in the range of about 20 wt % to about 80 wt %; and the second polysiloxane and the third polysiloxane are present in the composition in a total amount in the range of about 20 wt % to about 80 wt %.

17. A photocurable composition of claim 1, wherein the hydrosilylation catalyst is a thermally-activated hydrosilylation catalyst and is not a light-activated hydrosilylation catalyst.

18. A photocurable composition, comprising:
- a first polysiloxane comprising at least about two acrylate or methacrylate groups per molecule; wherein the first polysiloxane is present in an amount of about 10 wt % to about 50 wt %;
- a second polysiloxane containing at least one Si—H group per molecule, wherein the second polysiloxane is present in an amount of about 1 wt % to about 80 wt %;
- a third polysiloxane containing at least one reactive aliphatic ethylene group that is not a (meth)acrylate per molecule, wherein the third polysiloxane is present in an amount of about 1 wt % to about 80 wt %;
- a fourth polysiloxane comprising at least about one aliphatic ethylene group and at least about one Si—H group per molecule having a molecular weight of less than about 100,000 g/mol, wherein the fourth polysiloxane is present in an amount of about 1 wt % to about 80 wt %;
- a free radical photoinitiator in an amount of about 0.01 to about 10 weight % based on the total weight of (meth) acrylate-containing polysiloxane in the composition; and
- a hydrosilylation catalyst in an amount of about 0.001 to about 10 weight % based on the total weight of hydride-containing polysiloxane and vinyl-containing polysiloxane in the composition.

19. A photocurable composition of claim 18, wherein the fourth polysiloxane is present in an amount of about 10 wt % to about 80 wt %.

20. A method of forming a body comprising
providing a photocurable composition according to claim 1; and
curing the photocurable composition with actinic radiation to form a photocured three-dimensional body, then curing the photocured three-dimensional body with heat to form a heat-cured three-dimensional body.

* * * * *